(12) United States Patent
Noda et al.

(10) Patent No.: US 6,400,891 B1
(45) Date of Patent: Jun. 4, 2002

(54) VTR BUILT-IN CAMERA APPARATUS

(75) Inventors: Yasushi Noda; Kimio Maki, both of Tokyo; Isao Sasaki, Aichi; Chihiro Kaihatsu, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/675,408

(22) Filed: Jul. 2, 1996

(30) Foreign Application Priority Data

Jul. 3, 1995 (JP) .............................................. 7-167624

(51) Int. Cl.[7] .......................... H04N 5/765; H04N 5/77
(52) U.S. Cl. ....................................... 386/120; 386/117
(58) Field of Search ........................... 386/120, 66, 117, 386/118, 83.174, 107, 121, 52, 64, 38; 360/32; H04N 5/765, 5/77

(56) References Cited

U.S. PATENT DOCUMENTS 5,067,029 A * 11/1991 Takahashi .................... 386/117
5,598,275 A *  1/1997 Nagasawa et al. .......... 386/117

* cited by examiner

*Primary Examiner*—Robert Chevalier
(74) *Attorney, Agent, or Firm*—Sonnenschein, Nath & Rosenthal

(57) ABSTRACT

The VTR built-in camera apparatus according to the present invention includes a memory for storing a still picture signal, a VTR (VTR unit 10) for recording the still picture signal, and a button (photo-button 17) capable of being depressed at two steps, wherein when the button is depressed up to the first position, the still picture signal is stored in the memory and when the button is depressed up to the second position, the still picture signal is recorded on the tape.

4 Claims, 3 Drawing Sheets

VTR BUILT-IN CAMERA APPARATUS

BACKGROUND OF THE INVENTION

1. Field of the Invention

The present invention generally relates to a VTR built-in camera apparatus suitable for application to a digital VTR, for example.

2. Description of the Relating Art

In a VTR built-in camera apparatus, for example, a video signal generated from a photographing unit is processed and then recorded by a VTR unit in an arbitary format. In such an apparatus, an image of the recorded video signal is printed out by combining such camera apparatus with a so-called video printer.

In this case, however, if the video signal is recorded on the basis of a normal moving picture, it is difficult to obtain a satisfactory picture quality when such image of the video signal is printed. Thus, in order to obtain a picture of a higher quality in such a case, it is requested that the VTR built-in camera apparatus can record a photographed image as a still picture in advance. However, a conventional camera apparatus was not able to record such still picture with ease.

OBJECTS AND SUMMARY OF THE INVENTION

Therefore, in view of the above aspect, it is an object of the present invention to provide a VTR built-in camera apparatus which can record a still picture with ease.

According to an aspect of the present invention, there is provided a VTR built-in camera apparatus including a memory means for extracting arbitrary one frame of a video signal from a photographed video signal and storing therein the video signal of one frame as a still picture signal, a recording means for recording the still picture signal stored in the memory means on a recording medium, a first instructing means for instructing the memory means to store the still picture signal, and a second instructing means for instructing the recording means to record the still picture signal stored in the memory means on the recording medium.

According to another aspect of the present invention, there is provided a VTR built-in camera apparatus including a memory means for extracting arbitrary one frame of video signal from a photographed a video signal and storing therein the video signal of one frame as a still picture signal, a recording means for recording the still picture signal stored in the memory means on a recording medium, and a button capable of being depressed at two steps, or a first position and a second position, wherein when the button is depressed up to the first position, the memory means is instructed to store the still picture signal therein, and when the button is depressed up to the second position, the recording means is instructed to record the still picture signal stored in the memory means on the recording medium.

According to a still another aspect of the present invention, there is provided a VTR built-in camera apparatus including a first recording means for recording a photographed video signal on a recording medium in the unit of one field, a memory means for extracting arbitrary one frame of a video signal from a photographed video signal and storing therein the video signal of one frame as a still picture signal, a second recording means for recording the still picture signal stored in the memory means on a recording medium, a switching means for switching the first and second recording means, and a button capable of being depressed at two steps, or a first position and a second position, wherein when the button is depressed up to the first position, the memory means is instructed to store the still picture signal therein, and when the button is depressed up to the second position, the recording means is instructed to record the still picture signal stored in the memory means on the recording medium.

The above and other objects, features, and advantages of the present invention will become apparent from the following detailed description of an illustrative embodiment thereof to be read in conjunction with the accompanying drawings.

DETAILED DESCRIPTION OF THE PREFERRED EMBODIMENT

According to the present invention, there is provided a VTR built-in camera apparatus including a memory for extracting an arbitrary one frame of a video signal from a photographed video signal and storing therein the video signal of one frame as a still picture signal, a VTR unit for recording the stored still picture signal on a recording medium such as a tape for a predetermined period of time, and a button capable of being depressed at two steps, wherein when a user depresses the button up to a first position, the still picture signal is stored in the memory and when the user depresses the button up to a second position, the still picture signal is recorded on the tape.

Figure 1:
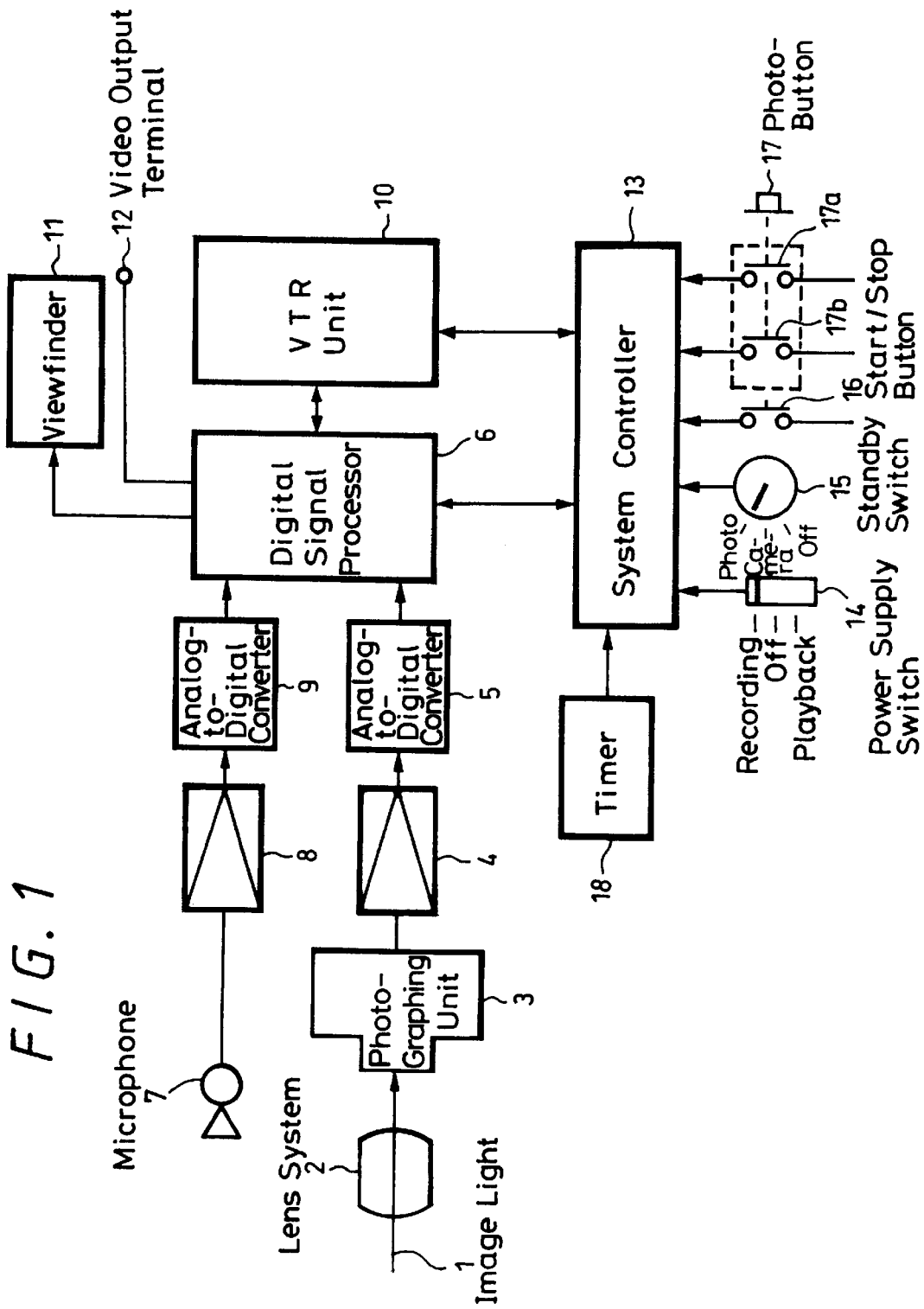
FIG. 1 is a diagram showing, in a block form, an arrangement of the VTR built-in camera apparatus according to an embodiment of the present invention.

One embodiment of the VTR built-in camera apparatus according to the present invention will hereinafter be described with reference to the attached drawings. FIG. 1 shows, in a block form, an arrangement of one embodiment of the VTR built-in camera apparatus according to the present invention.

As shown in FIG. 1, an image light 1 from an object (not shown) to be photographed is supplied through a lens system 2 to a photographing unit 3. A video signal from the photographing unit 3 is supplied through an amplifier 4 to an analog-to-digital converter 5, from which a digitized video signal is supplied to a digital signal processor 6.

Also, an audio signal picked up by a microphone 7 is supplied through an amplifier 8 to an analog-to-digital converter 9, from which a digitized audio signal is supplied to the digital signal processor 6. These digitized video and audio signals are synthesized by the digital signal processor 6 in an arbitrary format. A synthesized signal is supplied to a VTR unit 10 and recorded on a recording medium in a digital manner.

A video signal from the digital signal processor 6 is supplied to a viewfinder 11 and the video signal processed by the digital signal processor 6 is displayed thereon. Further, the video signal supplied to the viewfinder 11 is also supplied to a video signal output terminal 12.

Further, the VTR built-in camera apparatus includes a system controller 13 for controlling processing operations of the digital signal processor 6 and the VTR unit 10. The system controller 13 is supplied with a signal from a power supply switch 14 which is useful for switching off of the power supply, a recording mode and a playback mode, and also supplied with a signal from a standby switch 15 which is useful for switching off of the power supply, a camera apparatus (moving picture) standby and a photograph (still picture) standby.

Furthermore, the system controller 13 is supplied with a signal from a start/stop button 16 for controlling start and stop of the recording by the camera apparatus (moving picture) and signals from switches 17a, 17b forming a photo-button 17 which is capable of being depressed at two steps as will be described later on. Further, the system controller 13 is supplied with a timer signal from a timer 18 in which an arbitrary period of time can be set.

Figure 2:
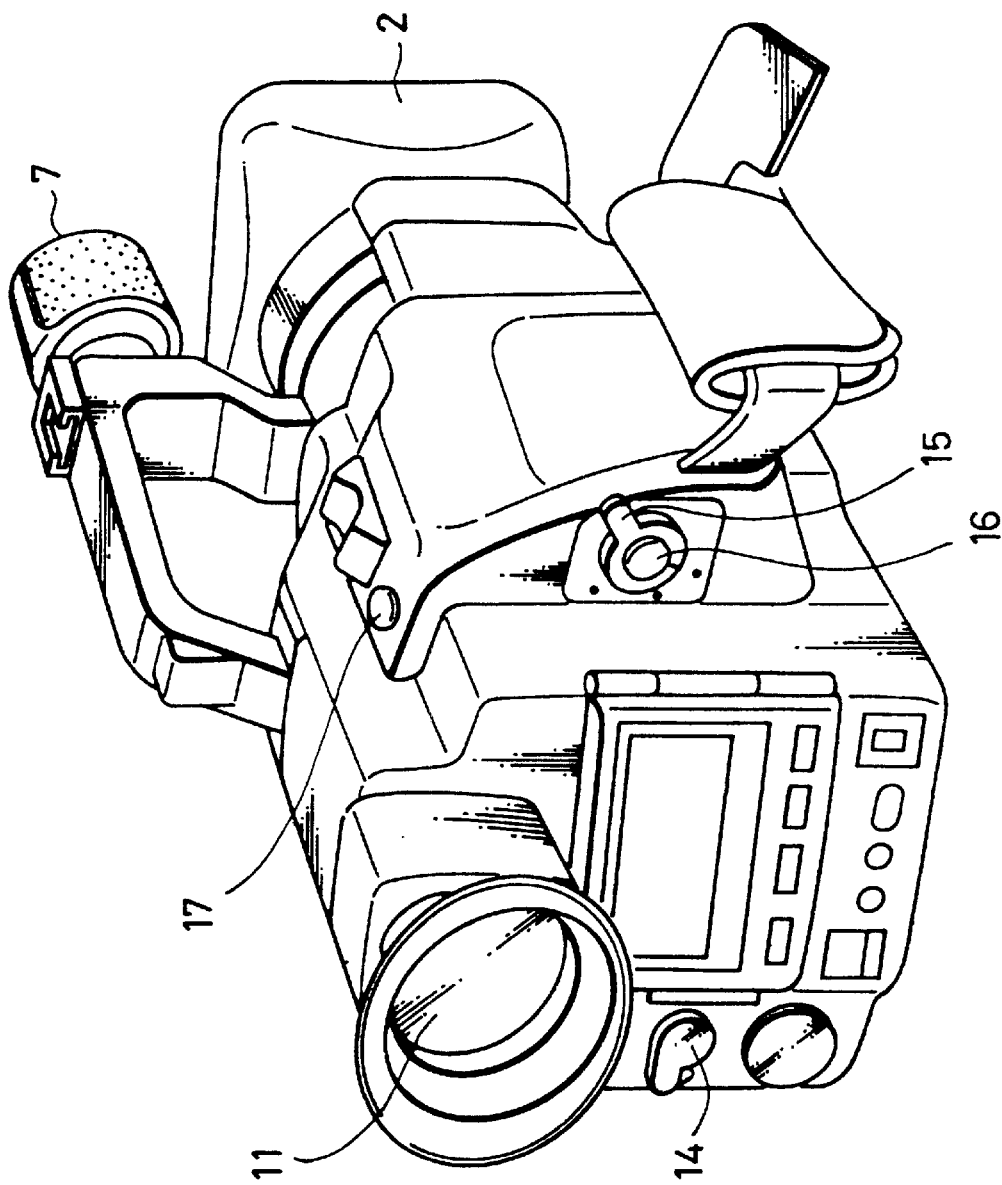
FIG. 2 is a perspective view showing an outer appearance of a main portion of a VTR built-in camera apparatus to which applied is the embodiment of the present invention.

FIG. 2 shows an outer appearance of the VTR built-in camera apparatus to which the present invention is applied as viewed from its slant rear direction. As shown in FIG. 2, on the front side of the VTR built-in camera apparatus, there are disposed the lens system 2 and the microphone 7. Although not shown, there is located the photographing unit 3 on the back side of the lens system 2. Further, the viewfinder 11 is located on the rear side of the camera apparatus.

As shown in FIG. 2, the power supply switch 14 is provided on the left side of the rear portion of the VTR built-in camera apparatus, the standby switch 15 is provided on the right side of the rear portion of the camera apparatus, and the start/stop button 16 is provided at the center of the standby switch 15. Further, the photo-button 17 is provided on the upper side of the camera apparatus.

Specifically, similarly to a conventional video camera apparatus, the start/stop button 16 is so disposed at a position that a user can operate the start/stop button 16 with his right hand thumb while the user holds the camera apparatus with his right hand and watches the image of an object to be photographed through the viewfinder 11. On the other hand, similarly to a shutter button of a conventional still camera, the photo-button 17 is so disposed at a position that the user can operate the photo-button 17 with his right hand index finger while the user holds the camera apparatus with his right hand and watches the viewfinder 11.

Figure 3:
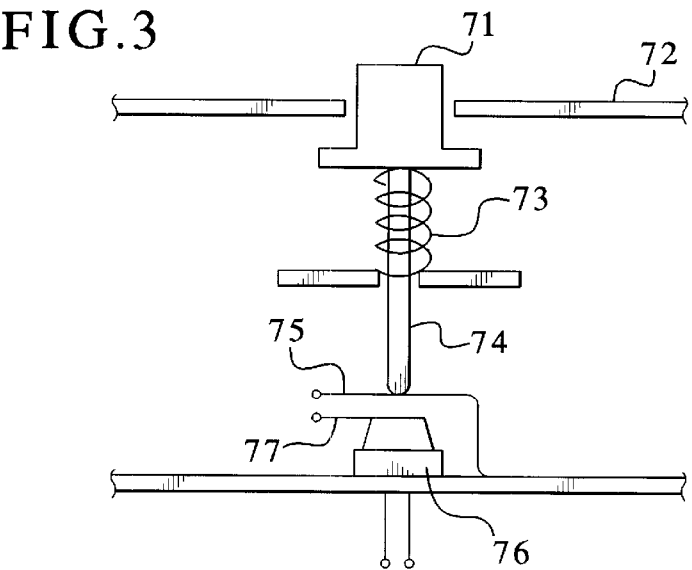
FIG. 3 is a diagram used to illustrate a button used in the present invention.

Further, the photo-button 17 is arranged as shown in FIG. 3, for example. That is, a button 71 is projectively provided from an outer housing 72, and this button 71 is urged by a spring 73 in the projecting direction from the outer housing 72. A rod 74 interlocking with the button 71 abuts at its free tip end against a contact 75. A switch 76 is provided under the contact 75, and a contact 77 opposite to the contact 75 is provided on the upper surface of the switch 76.

Accordingly, the photo-button 17 is operated as follows. That is, when the button 71 is depressed up to the half way thereof, the line between the contacts 75 and 77 is made on, and when the button 71 is further depressed, the switch 76 is turned on.

In the VTR built-in camera apparatus, if the power supply switch 14 is set in the recording mode and the standby switch 15 is set in the photo-standby mode, then the system controller 13 generates a control signal for setting a still picture recording mode and the digital signal processor 6 is set in the still picture recording mode.

In a normal moving picture recording mode, the digital signal processor 6 processes the video signal from the photographing unit 3 at every field. On the contrary, in the still picture recording mode, the digital signal processor 6 interpolates the video signal of one field and processes the video signal at every frame.

Under this state, if the photo-button 17 is depressed, it is depressed to the first position at first to turn the switch 17a on, the system controller 13 generates a control signal to place an image in a still state. The digital signal processor 6 receives the control signal and holds the video signal of one frame processed at that time in its internal memory. The video signal held at that time is supplied to the viewfinder 11 and displayed thereon.

If the photo-button 17 is further depressed to the second position to turn the switch 17b on, the system controller 13 generates a control signal for recording the still picture. The VTR unit 10 receives the control signal and then starts recording the still picture of the video signal which was held in the internal memory of the digital signal processor 6. After a time period of about 6.5 sec., for example, that was set to the timer 18, has elapsed, the VTR unit 10 halts the recording of the still picture.

Figure 4:
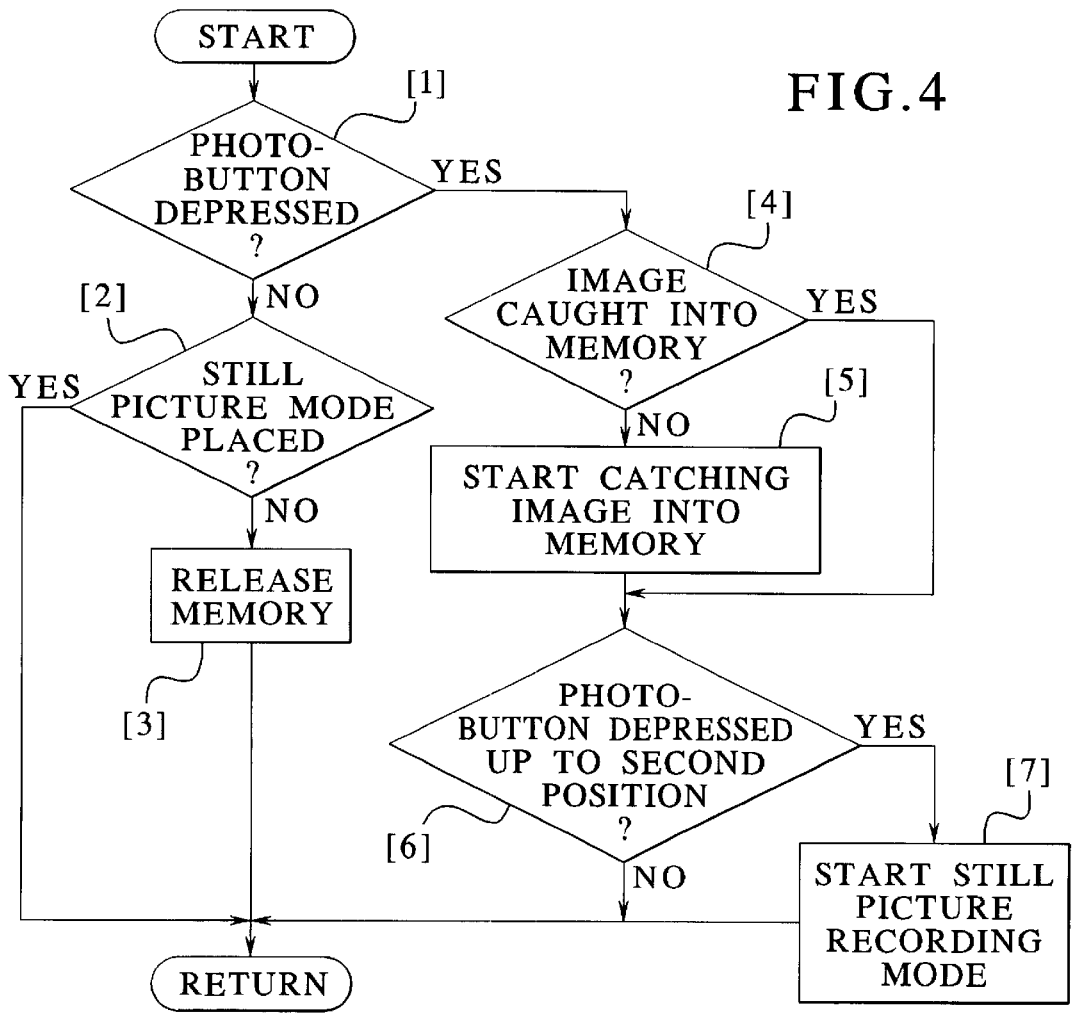
FIG. 4 is a flowchart used to explain an operation of the VTR built-in camera apparatus according to the present invention.

In other words, according to the camera apparatus, the system controller 13 is operated as shown in a flowchart of FIG. 4, for example. The flowchart of FIG. 4 shows a part taken out from an overall flow according to which the VTR built-in camera apparatus is operated.

As shown in FIG. 4, the system controller 13 determines whether the photo-button 17 is depressed or not in step [1]. If it is determined that the photo-button 17 is not depressed (N), the system controller 13 determines whether the still picture mode is placed or not in step [2]. If it is determined that the still picture mode is not placed (N), the system controller 13 releases the memory in step [3] and the processing goes to another step. If it is determined that the still picture mode is placed (Y) in step [2], the system controlling circuit 13 goes to another step while leaving the memory as it is.

If the system controller 13 determines that the photo-button 17 is depressed (Y) in step [1], then it is determined whether or not the memory is catching an image in step [4]. If the memory is not catching an image (N), then the system controller 13 makes the memory start catching an image in step [5].

Further, if it is determined that the memory starts catching the image and the memory is catching the image (Y) in step [4], the system controller 13 determines whether the photo-button 17 is depressed up to the second position or not. If it is determined that the photo-button 17 is not depressed up to the second position (N), the system controller 13 goes to another processing directly. If it is determined that the photo-button 17 is depressed up to the second position (Y) in step [6], the system controller 13 places the VTR unit 10 in the still picture recording mode in step [7] and goes to another processing.

In this manner, according to the VTR built-in camera apparatus, if the power supply switch 14 is placed in the recording mode, the standby switch 15 is placed in the photo-standby mode, and the photo-button 17 is not depressed, then the VTR unit 10 is placed in the stop mode and the viewfinder 11 displays the video signal of an image of an object photographed by the photographing unit 3.

Under this condition, if the photo-button 17 is depressed up to the first position, the still picture mode is placed and a picture held in the internal memory of the digital signal processor 6 is displayed on the viewfinder 11. The VTR unit 10 is left in the stop mode. From this state, if the photo-button 17 is further depressed up to the second position, the VTR unit 10 is placed in the recording mode and the image, which has been displayed on the viewfinder 11 and held in the internal memory of the digital signal processor 6, is recorded on the tape.

Specifically, according to the VTR built-in camera apparatus, under the state that a photographer depresses the photo-button 17 up to the first position, the photographer can confirm an image which is held in the internal memory of the digital signal processor 6 through the viewfinder 11. If the photographer wants the image, he may further depress the photo-button 17 up to the second position and can record the image on the tape by the VTR unit 10. Further, if the photographer does not want to record the image, he may once return the photo-button 17 to release the internal memory of the digital signal processor 6, and depresses the photo-button 17 again up to the first position. Then, a new still picture is displayed on the viewfinder 11.

In the above VTR built-in camera apparatus, even if the photo-button 17 is depressed from the non-depressed state to the second position one time, the image photographed by the photographing unit 3 when the photo-button 17 is depressed is also held in the internal memory of the digital signal processor 6, and the video signal of the still picture is recorded for about 6.5 sec. by the VTR unit 10.

As described above, the VTR built-in camera apparatus according to the present invention includes the memory for storing the still picture signal, the VTR unit for recording the still picture signal, and the button capable of being depressed at two steps, wherein when the button is depressed up to the first position, the still picture is stored in the memory and when the button is depressed to the second position, the still picture is recorded on the tape. Therefore, the still picture can be recorded satisfactorily by the above VTR built-in camera apparatus with a simple and easy operation.

Further, in the above VTR built-in camera apparatus, the still picture is recorded on the tape for a predetermined period of time that is set by the timer. Therefore, the user can search for the recorded still picture, even when the VTR unit 10 is driven in the high-speed searching mode.

According to the present invention, the VTR built-in camera apparatus includes the memory for storing the still picture signal, the VTR unit for recording the still picture signal, and the button capable of being depressed at two steps, wherein when the button is depressed to the first position, the still picture is stored in the memory and when the button is depressed up to the second position, the still picture is recorded on the tape. Therefore, the still picture can be recorded satisfactorily with a simple and easy operation.

Accordingly, if the video signal of the still picture recorded in the above manner is supplied to a video printer and printed thereby, print of extremely high picture quality can be realized.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A motion and still picture camera apparatus comprising:

conversion means to convert input image information into a digital signal prior to storing said image information and without storing analog signals representative of moving picture information;

memory means for storing at least one frame of a still picture;

a recording means for recording said still picture stored in said memory means on a recording medium; and a button capable of being depressed at a first position and a second position;

wherein when said button is depressed to said first position, said memory means is instructed to store said still picture therein, and when said button is depressed to said second position, said recording means is instructed to record said still picture stored in said memory means on said recording medium; and a means for recording digital motion picture information in a location other than a location of said image information from said still picture signal.

2. A motion and still picture camera apparatus comprising:

conversion means to convert input image information into a digital signal prior to storing said image information and without storing analog signals representative of moving picture information;

a first recording means for recording a still video signal on a recording medium;

a memory means for storing a still picture;

a second recording means for recording said still picture stored in said memory means on a recording medium;

a switching means for switching said first and second recording means; and a button capable of being depressed at a first position and a second position;

wherein when said button is depressed to said first position, said memory means is instructed to store said still picture signal therein, and when said button is depressed up to said second position, said second recording means is instructed to record said still picture signal stored in said memory means on said recording medium; and a means for recording digital motion pictures in a location other than a location of said image information from said still picture signal.

3. A motion and still camera apparatus according to claim 2, wherein said switching means is located at a position in which a photographer can operate the switching means with his right hand thumb, and said button is located at a position in which the photographer can operate said button with his right hand index finger.

4. A motion and still camera apparatus according to claim 2, wherein said button comprises:

a projecting portion projecting from an outer housing;

a resilient member urging said projecting portion to the outside;

a first contact connectable when said projecting portion is depressed inwardly to a first position; and a second contact connectable when said projecting portion is depressed inwardly to a second position.

* * * * *